US006295762B1

(12) United States Patent
Nemoto

(10) Patent No.: US 6,295,762 B1
(45) Date of Patent: Oct. 2, 2001

(54) ELEVATING SLIDER FOR GLASS WINDOW

(75) Inventor: Takehiko Nemoto, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/514,282

(22) Filed: Feb. 28, 2000

(30) Foreign Application Priority Data

Jan. 3, 1999 (JP) ........................................ 11-053169

(51) Int. Cl.[7] ........................................ B60J 1/16
(52) U.S. Cl. ........................................ 49/374
(58) Field of Search ........................................ 49/374, 375, 348, 49/349, 350, 351, 506; 16/93 R, 95 R

(56) References Cited

U.S. PATENT DOCUMENTS 3,466,803 * 9/1969 Packett ........................................ 49/374 X
4,829,630 * 5/1989 Church et al. ........................................ 49/374 X
4,935,986 * 6/1990 Church et al. ........................................ 49/374 X
5,036,621 * 8/1991 Iwasaki ........................................ 49/375 X
5,771,534 * 6/1998 Church ........................................ 49/375 X
6,055,778 * 5/2000 Ide et al. ........................................ 49/375

* cited by examiner

*Primary Examiner*—Jerry Redman
(74) *Attorney, Agent, or Firm*—Kanesaka & Takeuchi

(57) ABSTRACT

An elevating slider for elevating or lowering a glass window of a vehicle is formed of a slider main portion to be fitted in a guide channel and a shaft portion projecting from one end surface of the slider main portion. Sliding portions formed of an elastic material are provided at four corners of the slider main portion to be fitted in the guide channel, so that the sliding portions slide in a state where they are in contact with the inner surfaces of the guide channel. The glass window can be elevated or lowered without making any offensive sound, wobbling, unstable movement or the like.

12 Claims, 6 Drawing Sheets

ELEVATING SLIDER FOR GLASS WINDOW

BACKGROUND OF THE INVENTION AND RELATED ART STATEMENT

The present invention relates to a device or part for constituting an elevating or lowering (hereinafter simply referred to as "elevating") mechanism for elevating a glass window of a vehicle or the like, more particularly, a slider for elevating a glass window (window glass) by sliding in various kinds of rails or by guiding an elevating movement.

Elevating of a glass window assembled to a door of a vehicle is carried out by an elevating mechanism, for example, as shown in FIG. 9. More specifically, the elevating mechanism is structured such that one end of a main arm a1 rotatably attached to a door main portion d is slidably connected to an elevating rail r1 fixed to a lower edge portion of a glass window w through a slider s, and also, the other end of the main arm a1 is provided with a sector gear g so that the sector gear g is engaged with a pinion gear p connected to an elevating handle or a motor. Further, one end portion of a sub arm a2 rotatably connected to an intermediate portion in a longitudinal direction of the main arm a1 is slidably connected to the elevating rail r1 through a slider s, and the other end portion of the sub arm a2 is slidably connected to a fixed rail r2 fixed to the door main portion d through a slider s. Incidentally, in the drawing, a symbol c1 is a fixed shaft for rotatably connecting the main arm a1 and the door main portion d, and c2 is a connecting shaft for rotatably connecting the sub arm a2 to the main arm a1.

The main arm a1 swings around the fixed shaft c1 by allowing the pinion gear p to rotate through the elevating handle or the motor, so that the one end portion of the main arm a1 slidably connected to the elevating rail r1 slides along the elevating rail r1 to thereby elevate or lower the glass window w together with the elevating rail r1. At this time, further, while both end portions of the sub arm a2 slidably connected to the elevating rail r1 and the fixed rail r2 slide respectively along the rails r1 and r2, the sub arm a2 is associated with the main arm a1 to swing around the connecting shaft c2, so that the sub arm a2 supports the elevating movement of the glass window w while holding the glass window w at a predetermined angle.

In this case, as the sliders s for slidably connecting one end portion of the main arm a1 and two end portions of the sub arm a2 to the elevating rail r1 and the fixed rail r2, a slider s as shown in FIG. 7 has been generally used. More specifically, the conventional slider s is structured such that an approximately semi-spherical head portion h provided to a metallic shaft portion m is inserted into a hollow portion of a slider main portion k with a cylindrical shape, which is short in an axial direction and has a thick wall, made of a hard synthetic resin, such as polyoxymethylene, by an insertion molding.

Then, as shown in FIGS. 8(A) and 8(B), a forward end of the shaft portion m of the slider s is rotatably connected to the end portion of the main arm al or the sub arm a2 by clamping f. Also, the slider main portion k of the slider s is slidably fitted into a guide channel e formed in the hollow portion of the elevating rail r1 or fixed rail r2 (FIG. 8 shows only the elevating rail r1 fixed to the window glass w) and having a C-character section, and fixed to the window glass w or the door main portion d. The end portion of the main arm a1 or the sub arm a2 is slidably connected to the elevating rail r1 or fixed rail r2. Incidentally, symbols b and n in FIG. 8(A) are a bolt and a nut for fixing the elevating rail ri to the glass window w.

Also, though not specially shown in FIG. 9, there has been used a structure, wherein a guide rail is fixed to a door main portion d in a vertical direction; a guide slider fixed to a glass window w is slidably fitted into the guide rail; and the guide slider slides in the guide rail according to an elevating movement of the glass window w to thereby guide the elevating movement of the glass window w. In this case, also, as the guide slider and the guide rail, the same mechanisms as those of the slider s and the elevating rails r1 and r2 have been used.

However, in the conventional slider s, there are disadvantages such that an offensive sound is generated, wobbling takes place, elevating movement becomes unstable, or the like. In other words, the offensive sound generated when the slider s slides in the guide channel e is a frictional sound between the inner surface of the guide channel e and the slider main portion k, and the frictional sound is generated in case a contact pressure between them is too high. On the other hand, the wobbling and unstable elevating movement take place in case contact between the inner surface of the guide channel e and the slider main portion k is not uniform over the whole sliding area, gaps between them are created in parts or over the whole sliding area, or the contact pressure between them is not uniform.

In order to solve the above problems, it is preferable that the slider main portion k of the slider s stably slides, with a sufficient and suitable contact pressure over the whole sliding area along the inner surface of the guide channel e, but it is difficult to allow the slider main portion k to slide over the whole sliding area under such a good contacting condition due to the non-uniform accuracy in dimensions of both members. Or in order to hold such a good contacting state over the whole sliding area, both members have to be worked with an extremely high accuracy, which is actually impossible because of a high cost.

In view of the above defects, the present invention has been made, and an object of the invention is to provide an elevating slider for a glass window for elevating the glass window in a satisfactory manner, wherein the glass window can be elevated without creating offensive sound, wobbling, unstable movement of the glass window, and the like.

Another object of the invention is to provide a method of producing an elevating slider for a glass window as described above, wherein the elevating slider can be produced effectively and stably.

Further objects and advantages of the invention will be apparent from the following description of the invention.

SUMMARY OF THE INVENTION

In order to attain the above described objects, the present invention provides an elevating slider for a glass window used as a mechanism for elevating a glass window of a vehicle or the like and fitted in a guide channel formed in a rail having an approximately C-character section to slide therein. The elevating slider includes a slider main portion to be fitted into the guide channel and a shaft portion projecting from one end thereof. The slider main portion has an approximately square shape in a plane with sliding portions formed of elastic members on an outer circumferential portion of a base member made of a hard material, and the sliding portions are disposed on at least four corners of the slider main portion.

The slider of the invention is structured such that the slider main portion to be slidably fitted into the guide channel of the rail is provided with the sliding portions formed of an elastic material around an outer circumference of the base member made of the hard material. Since the sliding portions are disposed on four corners of the slider main portion, the slider main portion fitted into the guide channel slides in a state where the sliding portions formed of the elastic members contact the inner surface of the guide channel.

As described above, since the slider of the invention slides in the state where the sliding portions formed of the elastic material contacts the inner surface of the guide channel, even if the dimensions are not so accurate, the variety can be absorbed by the elastic deformations of the sliding portions. Thus, a good contact state can be held with a predetermined contacting pressure over the whole sliding area to thereby prevent the offensive sound created by a contacting pressure raised at the time of sliding, and the wobbling and unstable elevating movement of the glass window due to gaps or non-uniform contacting pressure created between the slider main portion and the inner surfaces of the guide channel, as little as possible.

Therefore, according to the elevating slider for the glass window of the invention, the glass window can be smoothly and stably elevated or lowered without creating the offensive sound, wobbling and unstable movement.

Also, though not especially limited, it is preferable that the four sliding portions formed of the elastic material and provided at the four corners of the slider main portion are integrally connected by connecting portions formed of the same elastic material. Thus, in case the four sliding portions are injection-molded by using a thermoplastic elastomer, cavities for molding the respective sliding portions are communicated with portions for molding the connecting portions to thereby satisfactorily feed the molding material to the respective cavities for molding the sliding portions, to provide the uniform feeding pressure to the molding material in the cavities for the respective sliding portions, and to stably and satisfactorily mold the respective sliding portions, which results in the slider of a high quality.

Further, it is preferable that the connecting portions for connecting the respective sliding portions are formed over an end surface and an outer circumferential surface at both outer circumferential end edges of the base member for constituting the slider main portion. Thus, the both outer circumferential end edges of the base member are wrapped or covered throughout the whole circumference by the respective sliding portions and the connecting portions for connecting the same, so that the base member and the sliding portions formed of different materials are effectively prevented from being peeled off at an interface thereof to thereby obtain the durable slider of a high quality.

Also, the present invention provides a producing method for effectively producing the above elevating slider of the invention, which includes the slider main portion where the sliding portions formed of the elastic material are provided around the outer circumference of the base member made of the hard material, and the shaft portion projecting from one end surface of the slider main portion.

In the production method of the elevating slider, after the shaft portion is inserted into a mold and the base member of the slider main portion is injection-molded on one end of the shaft portion at the primary molding, the base member is inserted into a mold to injection-mold the sliding portions around the outer circumference thereof at the secondary molding. The secondary mold for molding the sliding portions is formed of, at least, a movable mold provided with a molding face for molding one end surface of the slider main portion; a fixed mold provided with a molding face for molding the other end surface of the slider main portion; and a sliding mold provided with molding faces for molding the outer circumferential surfaces of the slider main portion. The base member obtained at the primary molding is disposed in a space formed by the movable mold, fixed mold and sliding mold and clamped to carry out the secondary molding for molding the elastic members. A secondary molded product can be obtained by opening the movable mold and the sliding mold and removing the same.

More specifically, in case the base member of the slider main portion is injection-molded with a hard thermoplastic resin at one end of the shaft portion made of a metallic material or the like, and further, the sliding portions are injection-molded to the outer circumference of the base member by using a thermoplastic elastomer to thereby mold the slider main portion provided with the sliding portions made of the thermoplastic elastomer at four corners thereof by using a normal two-phase split mold, first, the base member is injection-molded by the primary mold with the hard thermoplastic resin in a state where the shaft portion is inserted in the mold; a primary molded product where the base member made of the hard thermoplastic resin is molded at one end of the shaft portion, is removed from the primary mold; then, the primary molded product is inserted in a separately prepared secondary mold to injection-mold the sliding portions with the thermoplastic elastomer; and the obtained secondary molded product is removed from the secondary mold to thereby obtain the slider main portion.

In this case, at the time of the secondary molding, secondary molding cavities formed between the inner circumferential surfaces of the secondary mold and the primary product are only for the sliding portions provided to the four corners and the suitably provided connecting portions, and other outer surfaces of the primary product are closely attached to the inner circumferential surfaces of the mold. Therefore, when the secondary molding is carried out, the primary product obtained by the primary molding can not be easily inserted into the secondary mold. Therefore, for example, there is required such a troublesome work that the primary product is pushed into the secondary mold by a plastic hammer. Also, when the dimension of the primary product or the secondary mold is adjusted to easily insert the primary product into the secondary mold, the close contact between the outer surface of the primary product and the inner surface of the mold becomes insufficient, and there is a risk of leakage of the molding material from the cavities for molding the sliding portions, which results in a poor quality.

On the contrary, according to the producing method of the present invention, the molding surfaces of the secondary mold for molding the outer circumferential surfaces of the slider main portion are structured to be molded by the sliding mold. Therefore, when the primary product is set into the secondary mold, the primary product is covered with the movable mold, fixed mold and sliding mold for constituting the secondary mold so that the primary product can be clamped in an inserted state to thereby carry out the secondary work extremely easily and smoothly and, also, to effectively obtain the elevating slider of a high quality without leakage of the molding material.

Also, in case the elevating slider of the invention is molded by using the mold having the sliding mold, by providing a plurality of molding surfaces of the same shape to the movable mold for holding the shaft portion of the elevating slider and providing two kinds of molding surfaces, such as a primary surface and a secondary surface, to the fixed mold and the sliding mold, respectively, the primary molding and secondary molding can be carried out at the same time and continuously by a set of molds.

More specifically, the shaft portion is attached to the molding face of the movable mold, and then a cavity for the primary molding where the shaft portion has been inserted is constituted by the molding face of the movable mold and the primary faces of the fixed mold and the sliding mold to carry out the primary molding. The primary product obtained by opening the mold is once removed from the mold in a state where the primary product is held in the molding face of the movable mold, and the movable mold holding the primary product is rotated by a predetermined angle to constitute the secondary cavity, into which the primary product has been inserted and which is formed by the molding face of the movable mold having the primary product and the secondary faces of the fixed mold and the sliding mold. At this time, another shaft portion is attached to the other molding face of the movable mold to form another primary cavity, into which the shaft portion has been inserted and which is formed by the molding face of the movable mold and the primary faces of the fixed mold and the sliding mold. The primary molding and the secondary molding can be carried out simultaneously at the primary cavity and the secondary cavity, respectively. The thus produced primary product and the secondary product are simultaneously removed from the mold by opening the same, and after the secondary product is removed from the movable mold to collect, the movable mold is again rotated and another shaft portion is attached to the molding face of the movable mold from which the secondary product has been removed. By repeating the steps of the molding, removal and rotation of the movable mold as described above, the primary molding and the secondary molding are simultaneously and continuously carried out by a set of molds.

Therefore, according to the present method, when the elevating slider of the present invention is produced, since the primary molding and the secondary molding are continuously and automatically carried out, the slider of the invention can be extremely effectively produced.

DETAILED DESCRIPTION OF PREFERRED EMBODIMENTS

Hereunder, the present invention is explained specifically according to the embodiments.

Figure 9:
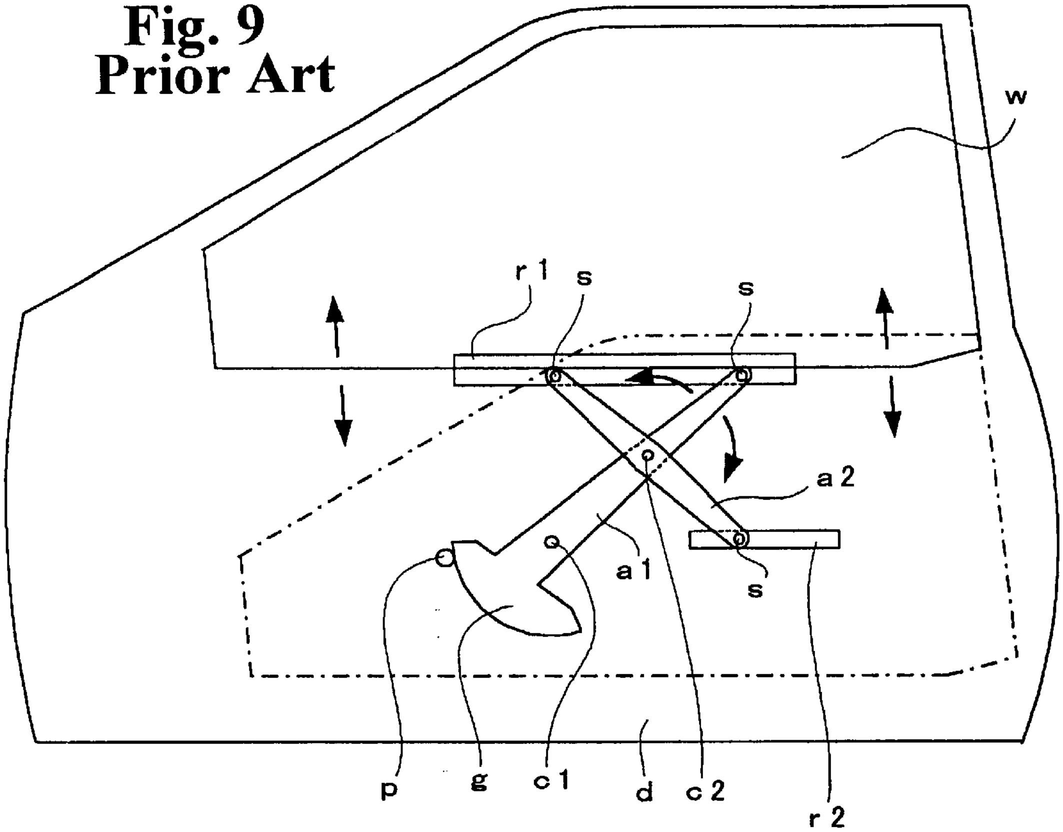
Fig. 9 Prior Art
FIG. 9 is a diagram showing an elevating mechanism of a general glass window in a vehicle.

FIGS. 1(A)–2(B) show an elevating slider for a glass window (window glass) of an embodiment according to the invention. The elevating slider can be used in case end portions of a main arm a1 and a sub arm a2 are slidably connected to an elevating rail r1 and a fixed rail r2 in a window glass elevating mechanism of a vehicle's door, for example, as shown in FIG. 9; or, though not shown in FIG. 9, the elevating slider can be used as a member for slidably connecting a glass window w to a guide rail for guiding an elevating movement of the glass window w. The elevating slider is formed of a slider main portion 1 to be slidably fitted into a guide channel of the elevating rail r1, fixed rail r2 or the guide rail, and a shaft portion 2 projecting from a central portion of one end surface of the slider main portion 1.

Figure 3A:
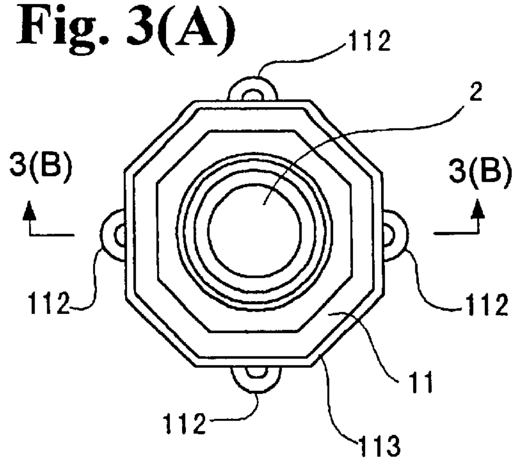
FIG. 3(A) is a plan view showing a base member and a shaft portion for constituting the elevating slider.
Figure 3B:
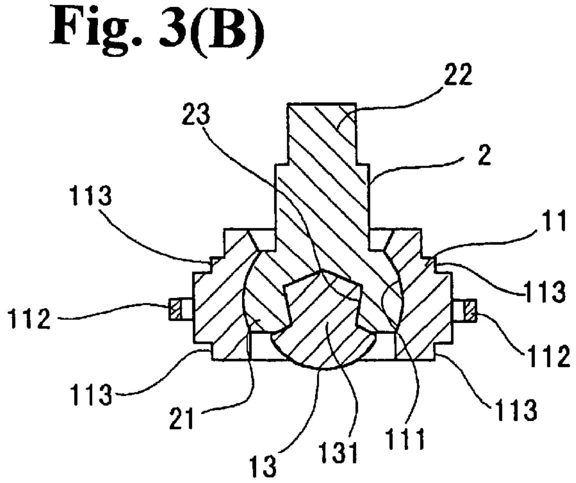
FIG. 3(B) is a sectional view of the base member and the shaft portion taken along line 3(B)—3(B) in FIG. 3(A)

The above slider main portion 1 is formed of a base member 11, and sliding portions or elastic members 12 provided at outer circumferential portions of the base member 11. The main portion 1 has a square shape in a plane. As shown in FIG. 3, the base member 11 is short in an axial direction and has a cylindrical shape with a thick wall to have an approximately octagonal shape in a plane. A hollow portion of the base member 11 forms a shaft fitting portion 111 having a wider diameter with a partially spherical shape in an intermediate portion in its axial direction, into which a head 21 of a shaft portion 2 is fitted. Also, four semi-annular projections 112 are disposed to outer circumferential surfaces of the base member 11 with a 90° displacement therebetween. Each semi-annular projection 112, as shown in FIG. 3(A), is located at the central portion of every other side among the sides for constituting an octagon, and the sliding portions 12, described later, are provided to the positions where the respective semi-annular projections 112 are located. Also, on outer circumferential edges at both ends in the axial direction of the base member 11, ring shape recesses 113 bridging over the end surface and the circumferential surface are provided throughout the circumference, and connecting portions 121, described later, made of the elastic material are disposed in the ring shape recesses 113.

The base member 11 is made of a hard material, and although its material is not especially limited, normally, a hard thermoplastic resin is used. Specifically, a thermoplastic resin, such as polyoxymethylene, is preferably used.

Figure 1A:
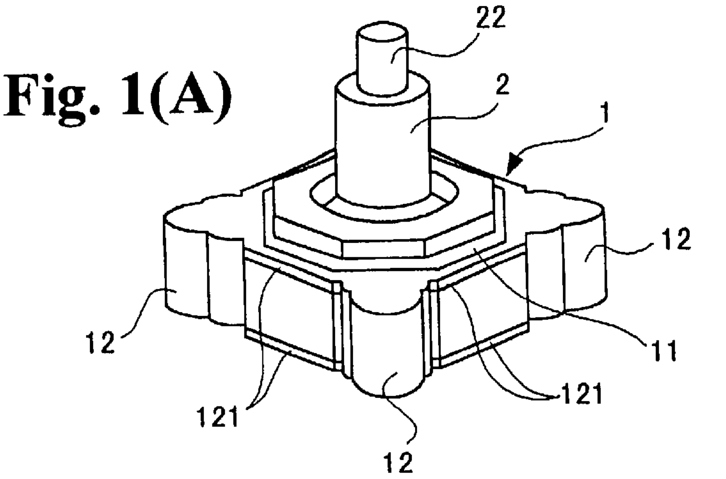
FIG. 1(A) is a perspective view showing an elevating slider of an embodiment according to the present invention.
Figure 1B:
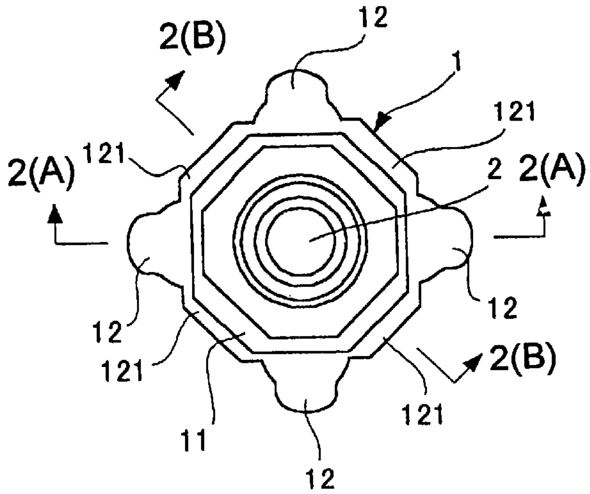
FIG. 1(B) is a plan view of the elevating slider.
Figure 1C:
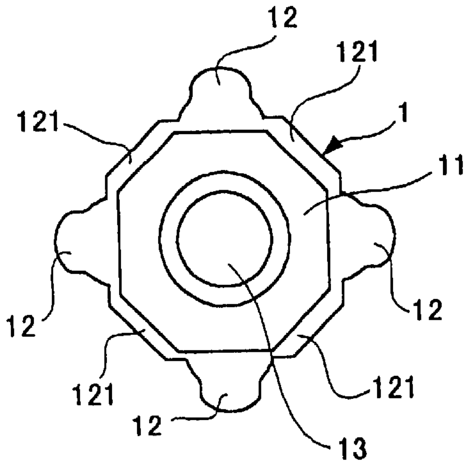
FIG. 1(C) is a bottom view of the elevating slider.
Figure 2A:
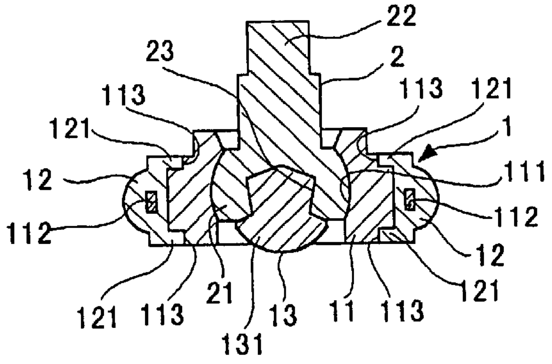
FIG. 2(A) is a sectional view showing the elevating slider taken along line 2(A)—2(A) in FIG. 1(B)
Figure 2B:
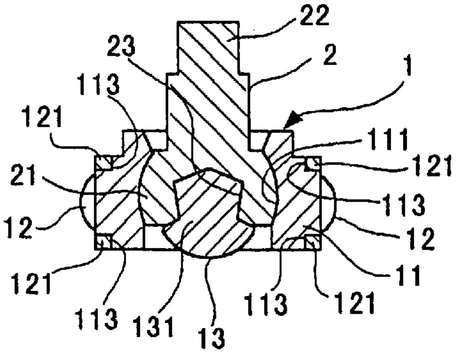
FIG. 2(B) is a sectional view of the elevating slider taken along line 2(B)—2(B) in FIG. 1(B)

The four sliding portions 12 formed along the outer circumference of the base member 11 are elastic projections having an approximately tumbler shape in its section, as shown in FIGS. 1(A), 1(B) and 1(C). The four sliding portions 12 are disposed with a 90° displacement from each other to cover the respective semi-annular projections 112 projecting from the base member 11. In this case, as shown in FIG. 2(A), portions of the elastic members constituting the sliding portions 12 pass through the hollow portions of the respective semi-annular projections 112 to thereby firmly fix the respective sliding portions 12 to the outer circumferential portion of the base member 11. Since the four sliding portions 12 are provided with a 90° displacement from each other around the outer circumference of the base member 11, the plane of the slider main portion 1 formed of the base member 11 and the four sliding portions 12 becomes an approximately rectangular shape in a plane, and also, a forward end of each sliding portion projects outwards from the outer circumferential surface of the base member 11.

Also, as shown in FIGS. 1(A)–2(B), the four sliding portions 12 are integrally connected to each other through connecting portions 121 formed of the same elastic material as that of the sliding portions 12 and located in the ring shape recesses 113 respectively provided to the both outer circumferential end edges of the base member 11. Each connecting portion 121 is formed to bridge over the end surface and outer circumferential surface of the base member 11, so that the outer circumferential edges of the base member 11 at both ends are wrapped or covered throughout the circumferences with the sliding portions 12 and the connecting portions 121 for connecting the respective sliding portions 12 to thereby effectively prevent the base member 11 and the sliding portions 12 made of different materials from being peeled off at an interface.

The sliding portions 12 and the connecting portions 121 are formed of the same elastic material. As the elastic material, an elastic material having a moderate elasticity, strength and relatively small frictional resistance is used. Although not specially limited, an injection moldable thermoplastic elastomer can be preferably used. More specifically, a polyester series thermoplastic elastomer, such as "HYTREL" manufactured by Toray-DuPont Co. Ltd. can be mentioned.

Next, as shown in FIGS. 1(A)–3(B), the shaft portion 2 is a metal columnar member having an approximately semi-spherical head portion 21 at one end, and a clamping or press-fitting portion 22 of a smaller diameter at the other end thereof. The shaft portion 2, as shown in FIGS. 2(A)–3(B), is attached to the slider main portion 1 such that the head portion 21 formed at one end thereof is fitted into the shaft fitting portion 111 provided inside the hollow portion of the base member 11, and the other end portion provided with the clamping portion 22 projects from a center of one end surface of the slider main portion 1.

Also, the head portion 21 of the shaft portion 2 is provided with a recess 23 opened at the top portion thereof, into which an elastic member 131 made of the same material as that of the sliding portion 12 is inserted. A part of the elastic member 131 passes through the hollow portion of the base member 11 and projects outwards from the other end surface of the slider main portion 1. The projected portion thereof constitutes a central sliding portion 13.

Figure 4A:
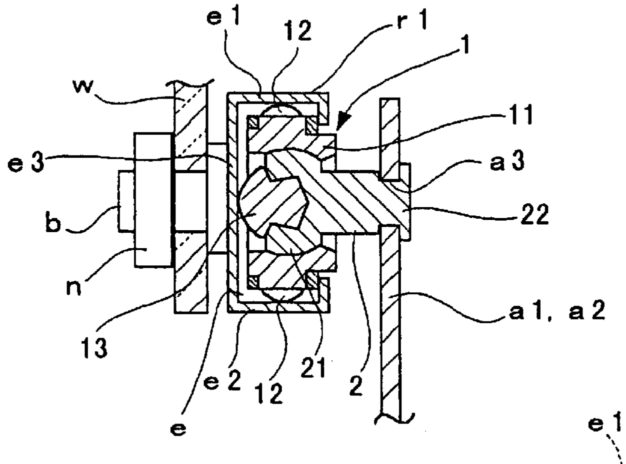
FIG. 4(A) is a sectional view showing a state where the elevating slider is slidably fitted into a guide channel.

The elevating slider of the present embodiment can be used when the end portion of the main arm a1 or the sub-arm a2 is slidably connected to the elevating rail r1 or the fixed rail r2 as shown in FIG. 9; or, though not shown, when a glass window w and a guide rail for guiding an elevating movement of the glass window w are slidably connected, in a window glass elevating mechanism of a vehicle door. For example, in case the end portion of the main arm a1 or the sub-arm a2 is connected to the elevating rail r1, as shown in FIG. 4(A), the clamping portion 22 of the shaft portion 2 is inserted into a connecting hole a3 formed on the end portion of the main arm a1 or the sub arm a2 to be subject to the clamping work. Thus, the slider of the present embodiment is rotatably attached to the end portion of the arm a1 or arm a2, and the slider main portion 1 of the elevating slider is slidably fitted into a guide channel e of the elevating rail r1 fixed to the glass window w to thereby connect the end portion of the main arm al or sub-arm a2 and the elevating rail r1. Incidentally, symbols b and n in FIG. 4(A) represent a bolt and a nut for fixing the elevating rail r1 to the glass window w.

Figure 4B:
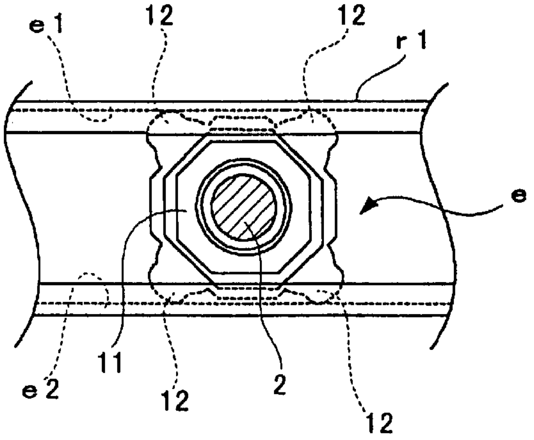
FIG. 4(B) is a plan view with a partial section of the above.

In this case, as shown in FIGS. 4(A) and 4(B), the slider main portion 1 slides in the guide channel e in such a state that the respective sliding portions 12 provided at four corners of the slider main portion 1 abut against the inner surfaces of both side walls e1, e2 of the guide channel e, and also, the central sliding portion 13 projecting from the end surface of the slider main portion 1 abuts against an inner surface of a bottom wall e3 of the guide channel e.

At this time, in the elevating slider of the present embodiment, the sliding portions 12 and the central sliding portion 13 are formed of the elastic material, and the respective sliding portions 12, 13 formed of the elastic material slide in a state of contacting the inner surfaces of the guide channel e. As described above, since the slider of the present embodiment slides in the state where the elastic sliding portions 12, 13 contact the inner surfaces of the guide channel e, even if the guide channel e and the slider have some irregularities in their dimensions, those irregularities can be absorbed by the elastic deformation of the sliding portions 12, 13, and the sliding portions can always keep a good contact with a predetermined contact pressure over the whole sliding area to thereby prevent the offensive sound from being generated by a high contacting pressure at the time of sliding as much as possible; and at the same time, to prevent wobbling and unstable elevating movement of the glass window w caused by the space and non-uniform contact pressure formed between the slider main portion 1 and the inner surfaces of the guide channel e as much as possible.

Therefore, according to the elevating slider for the glass window of the present embodiment, it is possible to elevate or lower the glass window w smoothly and stably without creating any offensive sound, wobbling and unstable movement.

Also, in the elevating slider according to the present embodiment, the semi-annular projections 112 projecting from the outer circumferential surfaces of the base member 11 are laid in the respective sliding portions 12 disposed to the four corners of the sliding main portion 1, and also, a part of the elastic member constituting each sliding portion 12 passes through the hollow portion of the semi-annular projection 112. Thus, the sliding portion 12 is firmly fixed to the outer circumference of the base member 11, and the sliding portion 12 is integrally connected by the connecting portion 121. Since the connecting portions 121 for connecting the respective sliding portions 12 are formed over the outer circumferential end surfaces of the base member 11 on the outer circumferential edges at both ends of the base member 11, the outer circumferential edges of the base member 11 are covered throughout the whole circumference with the respective sliding portions 12 and the connecting portions 121 connecting thereto to thereby effectively prevent the base member 11 and the sliding portions 12 made of different materials from being peeled off at an interface therebetween, and to obtain a high quality slider having an excellent durability.

Next, a method for manufacturing the elevating slider of the present embodiment is explained.

The elevating slider of the present embodiment can be produced by a normal two-color or two-material molding method by using a primary mold and secondary mold with a two-phase split type, wherein, first, the base member 11 is injection-molded with a hard thermoplastic resin by using the primary mold with the shaft portion 2 inserted thereinto; the primary product where the base member 11 made of the hard resin is molded on one end of the shaft portion 2 is removed from the primary mold; then, the primary product is inserted in the secondary mold separately prepared, and the sliding portions 12, 13 and the connecting portions 121 are injection-molded with the thermoplastic elastomer; and the obtained secondary product is removed from the secondary mold.

However, in case the slider of the present embodiment is produced by the conventional two-color molding method, secondary cavities created between inner circumferential surfaces of the secondary mold and the primary product at a time of the secondary molding are only used for the sliding portions 12 disposed to the four corners and the connecting portions 121 for integrally connecting the four sliding portions 12, and the other outer surfaces of the primary product closely contact the inner circumferential surfaces of the mold. Therefore, in case the secondary molding is carried out, the primary product obtained at the primary molding can not be easily inserted into the secondary mold. Thus, there is required a troublesome work such that, for example, the primary product is forcibly inserted into the secondary mold by a plastic hammer. Also, if the dimensions of the primary product or the secondary mold are adjusted to allow the primary product to be easily inserted into the secondary mold, the close contact between the outer surfaces of the primary product and the inner circumferential surfaces of the secondary mold becomes insufficient, and the molding material leaks out of the cavities for molding the sliding portions 12, 13 and connecting portions 121 to thereby be unable to produce.

Therefore, it is preferable to mold the elevating slider of the present embodiment by using a mold formed of: a movable mold provided with a molding face for molding one end surface, from which the shaft portion 2 is projected, of the slider main portion 1; a fixed mold provided with a molding face for molding the other end surface of the slider main portion 1; and a sliding mold provided with a molding face for molding outer circumferential surfaces of the slider main portion 1. When the secondary molding is carried out, the primary product is inserted into the above-described mold so as to be covered by the movable mold, fixed mold and sliding mold. Thus, the transferring work from the primary molding to the secondary molding can be smoothly and easily carried out, and moreover, the secondary molding can be carried out favorably without leakage of the material to thereby effectively and positively obtain a high quality elevating slider.

Further, in this case, the movable mold is provided with a plurality of the molding surfaces with the same shape enabling to hold the shaft portions 2, and the fixed mold and sliding mold are provided with two kinds of molding faces, i.e. a primary molding face and a secondary molding face. In this case, the primary molding and the secondary molding can be continuously and it simultaneously carried out by a set of molds.

Hereunder, a method for producing the elevating slider of the present embodiment by carrying out the primary molding and the secondary molding by using the molds provided with the sliding mold is specifically explained according to an embodiment.

Figure 5A:
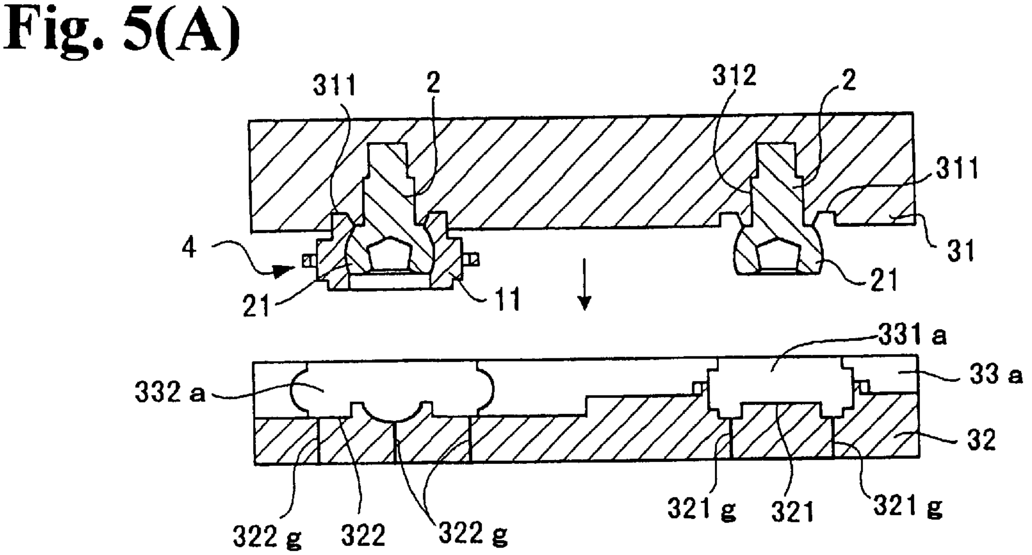
FIGS. 5(A)—5(C) are explanatory views for explaining a producing method of the invention.
Figure 5B:
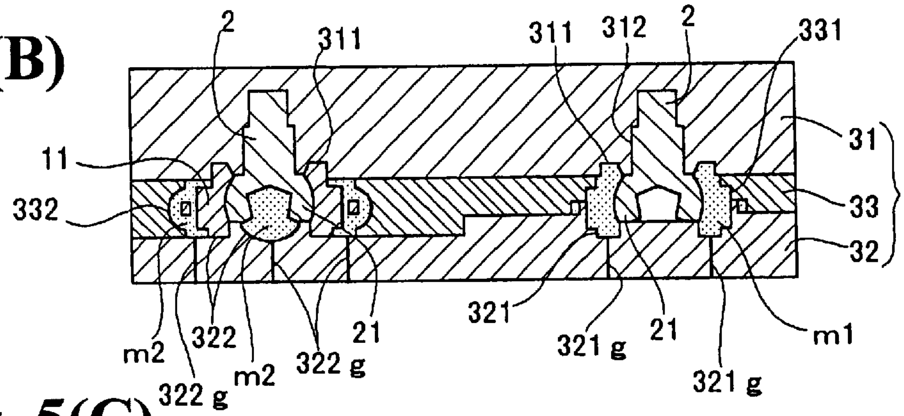
Figure 5C:
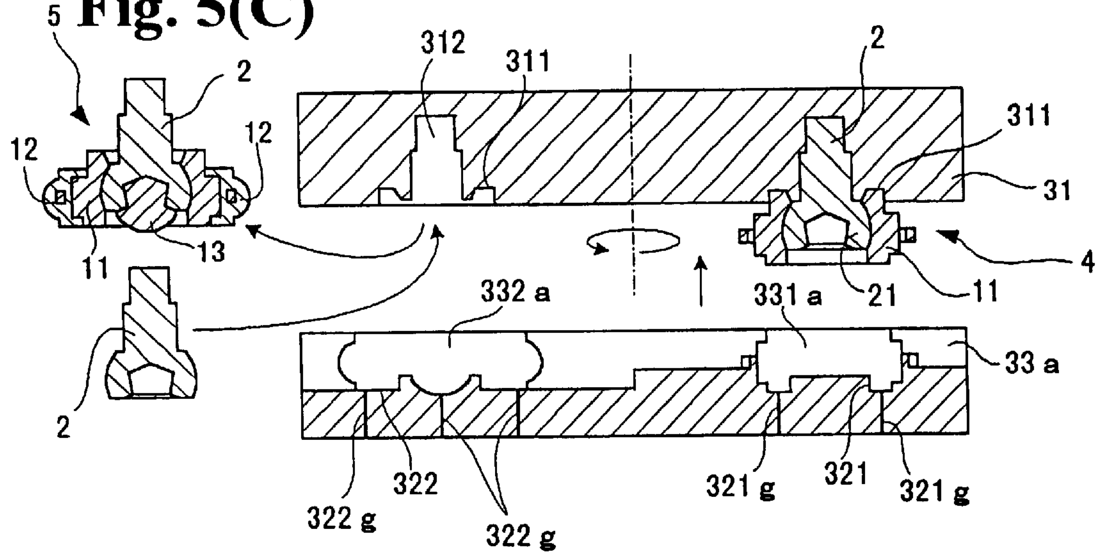

FIGS. 5(A), 5(B) and 5(C) show molds 3 formed of a movable mold 31, a fixed mold 32 and a sliding mold 33; and a procedure for molding the elevating slider by using the molds 3.

Figure 6A:
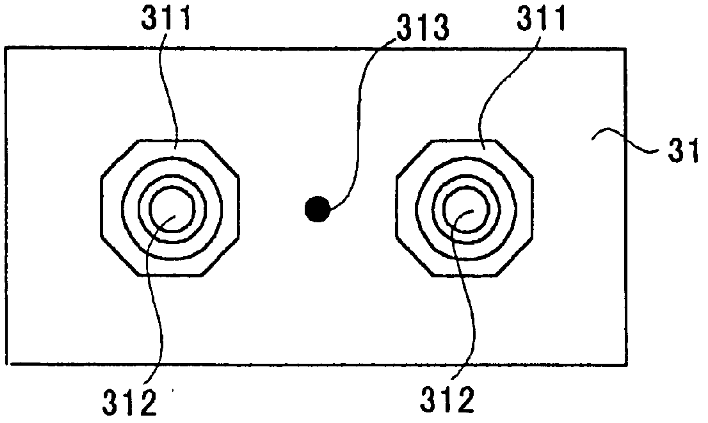
FIG. 6(A) is a plan view of a movable mold showing its molding face to be used in the producing method.

The movable mold 31, as shown in FIG. 6(A), is provided with molding faces 311 for molding the end surfaces of the slider main portions 1 on both sides relative to a center portion in the longitudinal direction thereof. The molding faces 311 have the same shape. Also, each molding face 311 is provided with a shaft portion insertion hole 312 at the center thereof to hold the shaft portion 2 therein. Further, the movable mold 31 is rotatable around a central point 313 by 180° in both directions, and through rotation of the movable mold 31 by 180°, positions of the above two molding faces 311 are replaced with each other.

Figure 6B:
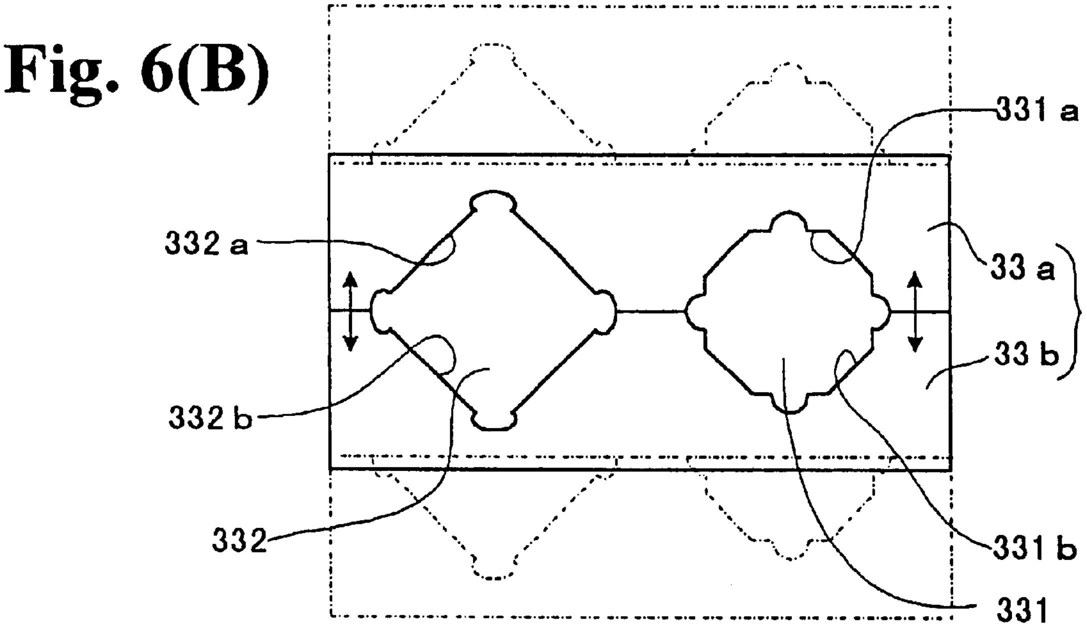
FIG. 6(B) is a plan view of a sliding mold used in the producing method.
Figure 6C:
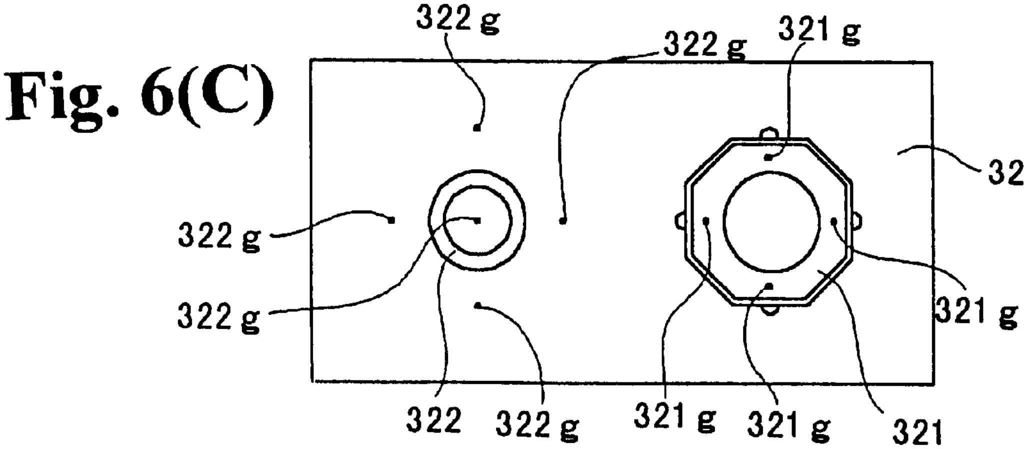
FIG. 6(C) is a plan view of a fixed mold used in the producing method.
Figure 7:
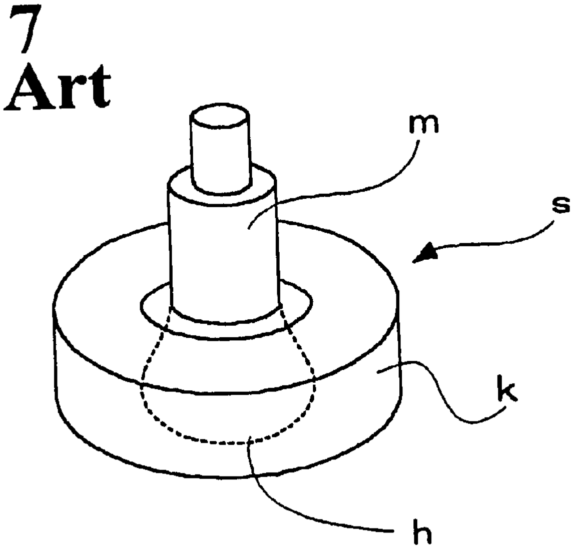
Fig. 7 Prior Art
FIG. 7 is a perspective view showing a conventional elevating slider.
Figure 8A:
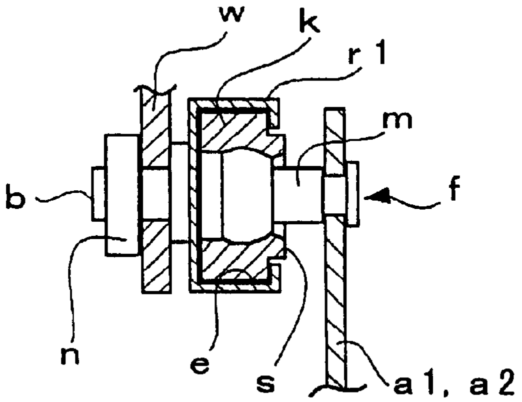
Fig. 8(A) Prior Art
FIG. 8(A) is a sectional view showing a state where the conventional slider is fitted into a guide channel.
Figure 8B:
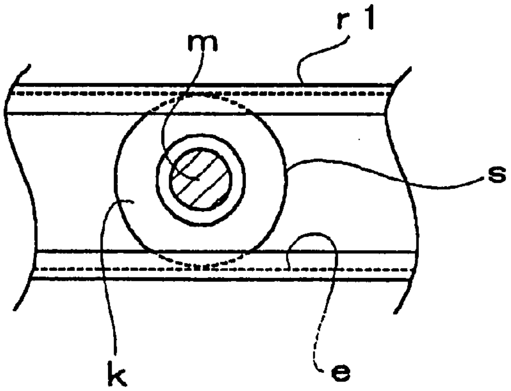
Fig. 8(B) Prior Art
FIG. 8(B) is a plan view with a partial section.

Also, the fixed mold 32, as shown in FIG. 6(C), is provided with a primary molding face 321 for molding the other end surface, i.e. the surface from which the shaft portion 2 does not project, of the base member 11 on one side relative to a center portion in a longitudinal direction thereof, and also, provided with a secondary molding face 322 for molding the other end surface and the central sliding portion 13 of the slider main portion 1 on the other side relative to the center portion. The primary molding face 321 on the fixed mold 32 is provided with four gates 321*g* at four positions with a 90° displacement therebetween, while the secondary molding face 322 is provided with five gates, i.e. a gate 322*g* at the center thereof and four gates 322*g* therearound with a 90° displacement between them.

Further, the sliding mold 33, as shown in FIG. 6(B), is formed of a pair of half molds 33*a*, 33*b*, wherein the half molds 33*a*, 33*b* slide in the opposite directions to be opened or closed. Primary molding faces 331*a*, 331*b* for the respectively molding halves of the outer circumferential surface of the base member 11 are provided on one side relative to a central portion in a longitudinal direction of the sliding mold 33, and secondary molding faces 332*a*, 332*b* for respectively molding halves of the outer circumferential surface of the slider main portion 1 are provided on the other side relative to the central portion. The sliding mold 33 constitutes a frame-like primary portion 331 for molding the whole outer circumferential surface, i.e. primary molding side, of the base member 11, and a frame-like secondary molding portion 332 for molding the whole outer circumferential surface, i.e. secondary molding side, of the slider main portion 1, by joining the half molds 33*a* and 33*b* in a state where the molding faces 331*a*, 332*a* face the respective molding faces 331*b*, 332*b*. Also, the primary molding portion 331 and the secondary molding portion 332 are opened by sliding both half molds 33*a*, 33*b* to the outer sides, as shown by single-dotted chain lines in FIG. 6(B).

Next, procedures and operations for molding the elevating slider of the present embodiment are explained by using the molds formed of the movable mold 31, the fixed mold 32 and the sliding mold 31, with reference to FIGS. 5(A)–5(C).

The molds 3 shown in FIGS. 5(A)–5(C) are constituted by a primary molding section on a right side from a center in the drawing and a secondary molding section on a left side therefrom. Although, in the molds 3, the primary molding and the secondary molding are carried out simultaneously in the primary molding section and the secondary molding section, explanation is made sequentially from the primary molding in the primary molding section. Incidentally, the sliding mold 33*a* as shown in FIGS. 5(A) and 5(C) shows a state where both half molds 33*a*, 33*b* are opened as shown by the single-dotted chain line in FIG. 6(B), and the sliding mold 33 as shown in FIG. 5(B) shows a state where both half molds 33$a$, 33$b$ are closed or joined.

First, as shown in FIG. 5(A), the shaft portion 2 is inserted into a shaft inserting hole 312 of the molding face 311 on the primary molding side, i.e. right side in the drawing, of the movable mold 31 to attach the shaft portion 2 to the molding face 311 on the primary molding side. Then, as shown in FIG. 5(B), the movable mold 31, fixed mold 32 and sliding mold 33 are joined to constitute a primary molding cavity with the shaft portion 2 therein by the molding face 311 of the movable mold 31, the primary molding face 321 of the fixed mold 32 and the primary molding portion 331 of the sliding mold 33. Then, a hard thermoplastic resin ml as a molding material is injected into the cavity from the respective gates 321g to carry out the primary molding to thereby mold the base member 11 around an outer circumference of the head portion 21 of the shaft portion 2.

Then, as shown in FIG. 5(C), by opening the mold 3, the primary product 4, wherein the base member 11 is molded around the outer circumference of the head portion 21 of the shaft portion 2, is once removed from the molds in a state to be held by the molding face 311 of the movable mold 31; the movable mold 31 thus holding the primary product 4 is rotated by 180° to transfer the primary product 4 to the secondary molding section on the left side in the drawing, as shown in FIG. 5(A); and also, another shaft portion 2 is attached to another molding face 311 positioned in the primary molding section of the movable mold 31, i.e. right side in the drawing.

Next, as shown in FIG. 5(B), the respective molds 31, 32 and 33 are joined to constitute a secondary molding cavity with the primary product 4 therein by the molding face 311 of the movable mold 31, the secondary molding face 322 of the fixed mold 32 and the secondary molding portion 332 of the sliding mold 33; and a new primary molding cavity with the shaft portion 2 inserted therein is formed by the molding face 311 on the primary molding side of the movable mold 31 provided with the shaft portion 2, the primary molding face 321 of the fixed mold 32 and the primary molding portion 331 of the sliding mold 33. Then, on the secondary molding side, a thermoplastic elastomer m2 as a molding material is injected into the cavity through the respective gates 322$g$ of the fixed mold 32 to carry out the secondary molding, so that the sliding portions 12 and 13 are molded at an outer circumference of the base member 11 and at the top of the head portion 21 of the shaft portion 2. While, on the primary molding side, the base member 11 is molded on the outer circumference of the head portion 21 of the shaft portion 2, in the same manner as described above.

Then, as shown in FIG. 5(C), the molds 3 are again opened to remove the obtained primary product 4 and a secondary product 5 from the molds; the secondary product 5 is taken out from the movable mold 31 to collect; the movable mold 31 is again rotated by 180°; and also, another shaft portion 2 is attached to one side of the molding face 311 of the movable mold 31 from which the secondary product 5 has been taken out. The procedure is repeated in the same manner as described above by molding, removing and rotating the movable mold in this order to thereby carry out the primary molding and the secondary molding simultaneously and continuously by the set of the molds.

As described above, according to the producing method as shown in FIGS. 5(A) to 5(C), since the molding face in the molds 3 for molding the outer circumferential surfaces of the slider main portion 1 is constituted by the sliding mold 33, when the primary product 4 is set in the secondary cavity, the primary product 4 is wrapped or covered by the movable mold 31, fixed mold 32 and sliding mold 33 for constituting the molds 3 and the molds 3 can be clamped in a state where the primary product 4 is inserted therein, so that the secondary molding work can be extremely easily and smoothly carried out. Moreover, there is no risk of leakage of a molding material to thereby positively obtain a high quality elevating slider.

Also, according to the method as shown in FIGS. 5(A) to 5(C), since the primary molding and the secondary molding of the elevating slider of the present embodiment can be performed simultaneously and continuously by a set of molds, the elevating slider of the present embodiment can be extremely effectively produced.

Further, in the elevating slider of the present embodiment, since the respective sliding portions 12 are integrally connected by the connecting portions 121, in the secondary molding wherein the respective sliding portions 12 are injection-molded by using the thermoplastic elastomer, the cavities for molding the respective sliding portions 12 are communicated with the portions constituting the connecting portions 121. Thus, the molding material is well distributed to the cavities for molding the respective sliding portions, and also, molding material feeding pressures in the cavities for molding the respective sliding portions become uniform. to thereby stably form the sliding portions 12 and surely obtain the high quality sliders.

Incidentally, the elevating slider of the present invention is not limited to the above described embodiment. For example, the connecting portions 121 for integrally connecting the respective sliding portions 12 provided at the four corner portions of the elevating slider may be omitted, or under certain circumstances, the shaft portion 2 may be integrally molded with the same hard thermoplastic resin as that of the base member 11. Contrary to this, the base member 11 may be integrally formed with the same metal as that of the shaft portion 2. Further, shapes and structures of the respective sliding portions 12, base member 11 and shaft portion 2 may be suitably changed unless they deviate from the subject matter of the present invention.

Furthermore, the production method of the invention is not limited to the above described embodiment. For example, in the above embodiment, while the molds 3 are provided with one primary molding cavity and one secondary molding cavity, more than two primary molding cavities and secondary molding cavities may be ho provided. Further, only the secondary molding cavity may be provided, and the primary molding may be carried out by another mold. Incidentally, although it is preferable that the elevating slider of the present invention is produced according to the producing method of the invention, it may be produced by other methods.

As described hereinabove, according to the elevating slider for the glass window according to the present invention, the glass window can be elevated or lowered without creating any offensive sound, wobbling, unstable movement, or the like. Also, according to the manufacturing method of the invention, the elevating slider for the glass window can be stably and efficiently produced.

While the invention has been explained with reference to the specific embodiments of the invention, the explanation is illustrative and the invention is limited only by the appended claims.

What is claimed is:

1. An elevating slider for an elevating mechanism, comprising:

a slider main portion to be fitted in a guide channel for the elevating mechanism having a substantially square shape in a plane, said slider main portion including a base member made of a hard material, a plurality of sliding portions made of an elastic material different from the hard material and disposed at least at four corners of the slider main portion, and connecting portions formed of said elastic material and integrally connected with the sliding portions positioned at the four corners of the sliding main portion, each connecting portion being formed over an outer circumferential end surface of the base member; and a shaft portion projecting from one end surface of the slider main portion.

2. An elevating slider as claimed in claim 1, wherein said base member has two end surfaces and a hollow portion communicating with the end surfaces, and said shaft portion has a shaft projecting from one of the end surfaces of the base member and a semi-spherical head provided at one end of the shaft and fitted in the hollow portion to partially project from the other of the end surfaces.

3. An elevating slider as claimed in claim 2, wherein said head includes a central sliding portion formed of an elastic member, said central sliding portion projecting from the other of the end surfaces.

4. An elevating slider as claimed in claim 1, wherein said base member includes projections having through holes and formed on an outer circumferential surface thereof, said projections being buried in the sliding portions so that portions of the elastic material for constituting the sliding portions are disposed in the through holes of the projections.

5. A method of producing an elevating slider according to claim 1, comprising:

inserting a shaft portion into a first mold, molding a base member of a slider main portion by a hard material on one end portion of the shaft portion to prosecute a primary molding inserting the base member into second molds formed of a movable mold, a fixed mold and a sliding mold, and clamping the second molds, molding sliding portions by an elastic material around an outer circumference of the base member to prosecute a secondary molding; and removing an obtained secondary product from the moving mold and the sliding mold.

6. A method of producing an elevating slider as claimed in claim 5, wherein said movable mold forms one end of the base member, said fixed mold forms the other end of the base member, and said sliding mold forms a periphery of the base member.

7. A method of producing an elevating slider as claimed in claim 6, wherein said movable mold includes a plurality of molding faces of a same shape to hold the shaft portions, said fixed mold includes a primary molding face and a secondary molding face, and said sliding mold includes a primary molding face and a secondary molding face; one of the molding faces of the movable mold and said primary molding faces of the fixed mold and the sliding mold form the first mold to constitute a primary molding cavity of the first mold where said shaft portion is inserted, said primary molding being prosecuted in the primary molding cavity.

8. A method of producing an elevating slider as claimed in claim 7, wherein after prosecuting the primary molding, said first mold is opened to remove a primary product in a state where the primary product is held in the movable mold; said movable mold holding the primary product is rotated by a predetermined angle to constitute a secondary molding cavity by the molding face of the movable mold and the secondary molding faces of the fixed mold and sliding mold, said primary product being inserted into the secondary molding cavity and prosecuting the secondary molding.

9. A method of producing an elevating slider as claimed in claim 8, wherein before the secondary molding is prosecuted, another shaft portion is attached to another molding face of the movable mold so that the other molding face and the primary molding faces of the fixed mold and the sliding mold constitute a new primary molding cavity where the shaft portion is inserted; the primary molding and secondary molding are carried out simultaneously at the respective cavities; the first and second molds are opened to remove the primary and secondary products at the same time; the secondary product is removed from the movable mold; the movable mold is rotated and a new shaft portion is attached to the molding face of the movable mold from which the secondary product has been removed; and same procedures of molding, removing and rotating are repeated sequentially so that the primary molding and the secondary molding are simultaneously and continuously carried out by the molds.

10. An elevating slider as claimed in claim 1, wherein each of said sliding portions has a solid corner portion with a curved surface projecting obliquely outwardly from the base member.

11. An elevating slider as claimed in claim 10, wherein said base member includes four outer circumferential end surfaces with recesses at edges thereof, each end surface being sandwiched between two sliding portions situated adjacent to each other and said connecting portions being located in the recesses.

12. An elevating slider as claimed in claim 11, wherein said sliding portions project in directions from a middle of the base member to corner portions of the substantially square shape of the slider main portion so that forward ends of the sliding portions project outwardly from the end surfaces.

* * * * *